US012683960B2

(12) United States Patent
Chaudhary et al.

(10) Patent No.: US 12,683,960 B2
(45) Date of Patent: \*Jul. 14, 2026

(54) EMAIL PROCESSING FOR IMPROVED AUTHENTICATION QUESTION ACCURACY

(71) Applicant: Capital One Services, LLC, McLean, VA (US)

(72) Inventors: Viraj Chaudhary, Katy, TX (US); Vyjayanthi Vadrevu, Pflugerville, TX (US); Tyler Maiman, Melville, NY (US); David Septimus, New York, NY (US); Samuel Rapowitz, Roswell, GA (US); Jenny Melendez, Falls Church, VA (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 76 days.

This patent is subject to a terminal disclaimer.

(21) Appl. No.: 18/884,552

(22) Filed: Sep. 13, 2024

(65) Prior Publication Data

US 2025/0016156 A1    Jan. 9, 2025

Related U.S. Application Data

(63) Continuation of application No. 18/243,334, filed on Sep. 7, 2023, now Pat. No. 12,120,114, which is a
(Continued)

(51) Int. Cl.
*H04L 9/40* (2022.01)
*G06F 18/214* (2023.01)
(Continued)

(52) U.S. Cl.
CPC ........ *H04L 63/0876* (2013.01); *G06F 18/214* (2023.01); *G06N 20/00* (2019.01);
(Continued)

(58) Field of Classification Search
CPC . H04L 63/0876; H04L 63/102; H04L 63/123; H04L 41/16; G06F 18/214;
(Continued)

(56) References Cited

U.S. PATENT DOCUMENTS 8,997,240 B1 * 3/2015 Kohen .................... G06F 21/31
                                                     713/182
9,152,775 B1 * 10/2015 Kronrod ................. G06F 21/31
                     (Continued)

OTHER PUBLICATIONS

Ullah, Abrar, et al. "Graphical and text based challenge questions for secure and usable authentication in online examinations." The 9th International Conference for Internet Technology and Secured Transactions (ICITST-2014). IEEE, 2014. (Year: 2014).*
(Continued)

*Primary Examiner* — Jung W Kim
*Assistant Examiner* — Sameera Wickramasuriya
(74) *Attorney, Agent, or Firm* — Banner & Witcoff, Ltd.

(57) ABSTRACT

Methods, systems, and apparatuses are described herein for improving the accuracy of authentication questions using e-mail processing. A request for access to an account may be received from a user device. A plurality of organizations may be identified. One or more e-mail associated with the account may be identified. The e-mails may be processed to identify one or more organizations that correspond to transactions conducted by a user. A modified plurality of organizations may be generated by removing, from the plurality of organizations, the one or more organizations. An authentication question may be generated and provided to the user device. A response to the authentication question may be received, and the user device may be provided access based on the response.

20 Claims, 6 Drawing Sheets

Related U.S. Application Data continuation of application No. 17/314,690, filed on May 7, 2021, now Pat. No. 11,785,007.

(51) Int. Cl.
| | |
|---|---|
| *G06N 20/00* | (2019.01) |
| *G06Q 10/107* | (2023.01) |

(52) U.S. Cl.
CPC ......... *G06Q 10/107* (2013.01); *H04L 63/102* (2013.01); *H04L 63/123* (2013.01)

(58) Field of Classification Search
CPC .. G06F 2221/2103; G06F 21/31; G06F 30/27; G06N 20/00; G06Q 10/107
See application file for complete search history.

(56) References Cited

U.S. PATENT DOCUMENTS

| | | | | |
|---|---|---|---|---|
| 10,243,935 | B2 * | 3/2019 | Weber ................... | H04L 63/107 |
| 10,505,912 | B2 * | 12/2019 | Assali ..................... | G06F 21/36 |
| 10,812,460 | B2 * | 10/2020 | Kurian .................... | G06F 21/31 |
| 11,030,287 | B2 * | 6/2021 | Obaidi ................... | G06N 20/00 |
| 11,068,891 | B2 * | 7/2021 | Ghosh ................... | G06F 21/316 |
| 11,356,455 | B2 * | 6/2022 | Su .......................... | H04W 12/63 |
| 2009/0235280 | A1 * | 9/2009 | Tannier ................. | G06Q 10/00 719/318 |
| 2010/0131409 | A1 * | 5/2010 | Lawyer ................. | G06F 21/313 707/769 |
| 2012/0214442 | A1 * | 8/2012 | Crawford .............. | G06F 21/316 455/411 |
| 2012/0216260 | A1 * | 8/2012 | Crawford ................ | G06F 21/31 726/5 |
| 2013/0318580 | A1 * | 11/2013 | Gudlavenkatasiva .. | H04L 63/08 726/7 |
| 2014/0259130 | A1 * | 9/2014 | Li ........................... | G06F 21/31 726/6 |
| 2015/0161375 | A1 * | 6/2015 | Ghosh .................... | G06F 21/36 726/7 |
| 2016/0191498 | A1 * | 6/2016 | Marien ................. | H04L 9/3271 726/7 |
| 2016/0262017 | A1 * | 9/2016 | Lavee ..................... | G06F 21/31 |
| 2018/0349853 | A1 * | 12/2018 | Low ...................... | H04L 63/102 |
| 2019/0197543 | A1 | 6/2019 | Gupta et al. | |
| 2020/0104876 | A1 * | 4/2020 | Chintakindi ....... | G06Q 30/0222 |
| 2020/0372403 | A1 * | 11/2020 | Kursun ................... | H04L 41/16 |
| 2021/0073371 | A1 | 3/2021 | Semichev et al. | |

OTHER PUBLICATIONS

Babic, Anitra, et al. "Building robust authentication systems with activity-based personal questions." Proceedings of the 2nd ACM workshop on Assurable and usable security configuration. 2009. (Year: 2009).*

How Do I Verify My Identity Using Security Questions, ID.me Support, 4 pages, <<https://help.id.me/hc/en-us/articles/360017923533-How-do-I-verify-my-identity-using-security-questions-, printed May 7, 2021.

Dynamic KBA (Knowledge-Based Authentication), ExpectIDO IQ, IDology, 9 pages, <<https://www.idology.com/dynamic-kba/, printed May 6, 2021.

Oct. 17, 2011, Pearson, infoRiskO Today, FFIEC Authentication Guidance: The Case for Knowledge-Based Authentication, 13 pages, <<https://www.inforisktoday.com/ffiec-authentication-guidance-case-for-knowledge-based-authentication-a-4146>>, printed May 6, 2021.

May 11, 2015, Everything You Wanted to Know About Dynamic KBA, 5 pages, <<https://pipl.com/post/everything-you-wanted-to-know-about-dyanic-kba>>, printed May 6, 2021.

Aug. 17, 2022—(WO) International Search Report and Written Opinion—PCT/US2022/072150.

Renaud, Karen and Mike Just "Pictures or questions? Examining user responses to association-based authentication." Proceedings of HCI 2010 24 (2010): 98-107.

Ann Nosseir et al. "Question-Based Group1 Authentication" Proceedings of the 18th Australia Conference on Computer-Human Interaction: Design: Activities, Artefacts and Environments, 2006.

Bin B. Zhu et al. "Captcha as graphical passwords—A new security primitive based on hard AI problems" IEEE transactions on information forensics and security 9.6 (2014): 891-904.

* cited by examiner

Username:

Password:

Submit

401A

401B

401C

User Interface
(400a)

Where did you buy coffee last week?

402A

Joe's Coffee

403A

Bob's Coffee

403B

Tim's Coffee

403C

Submit

402B

User Interface
(400b)

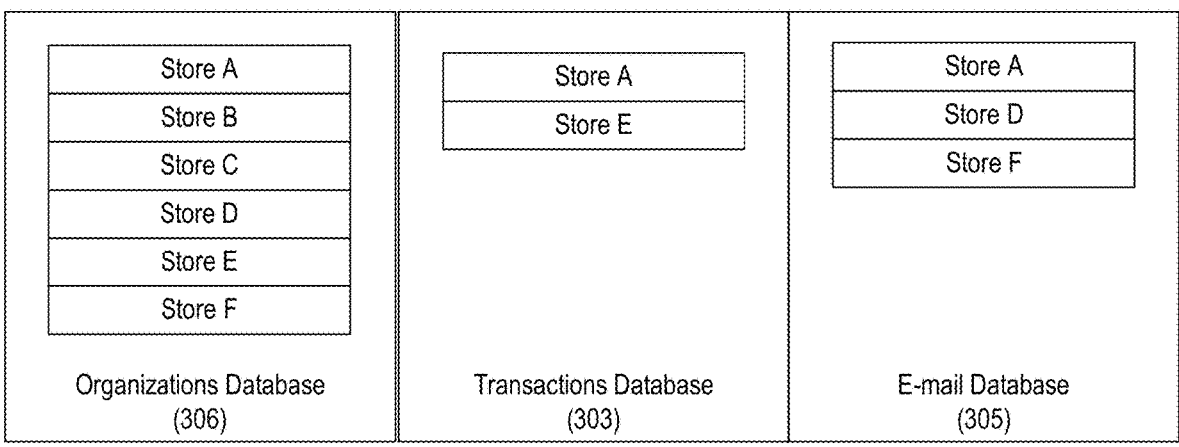
FIG. 6A
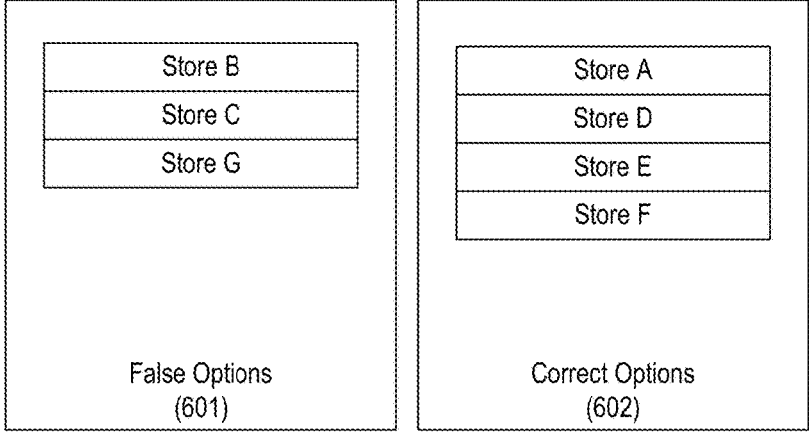
FIG. 6B
Where did you shop last week?
O    Store C
O    Store A
O    Store G
User Interface
(603)
FIG. 6C

EMAIL PROCESSING FOR IMPROVED AUTHENTICATION QUESTION ACCURACY

CROSS-REFERENCE TO RELATED APPLICATIONS

The present application is a continuation of U.S. Ser. No. 18/243,334, filed Sep. 7, 2023, entitled "Email Processing for Improved Authentication Question Accuracy," is a continuation of U.S. Ser. No. 17/314,690, filed on May 7, 2021, entitled "Email Processing for Improved Authentication Question Accuracy", which is hereby incorporated by reference in its entirety.

FIELD OF USE

Aspects of the disclosure relate generally to authentication of computing devices. More specifically, aspects of the disclosure may provide for enhanced authentication of computing devices based on analyzing e-mail data and transactions conducted by users of those computing devices.

BACKGROUND

As part of determining whether to grant a user device access to content (e.g., a website containing personal information, such as banking information), a user of the user device might be prompted with one or more authentication questions. Such questions might relate to, for example, a password of the user, a personal identification number (PIN) of the user, or the like. Those questions might additionally and/or alternatively be generated based on personal information of the user. For example, when setting up an account, a user might provide a variety of answers to predetermined questions (e.g., "Where was your father born?," "Who was your best friend in high school?"), and those questions might be presented to the user as part of an authentication process. As another example, a commercially-available database of personal information might be queried to determine personal information for a user (e.g., their birthdate, birth state, etc.), and that information might be used to generate an authentication question (e.g., "Where were you born, and in what year?").

As part of authenticating a computing device, information about financial transactions conducted by a user of that computing device might be used to generate authentication questions as well. For example, a user might be asked questions about one or more transactions conducted by the user in the past (e.g., "Where did you get coffee yesterday?," "How much did you spend on coffee yesterday?," or the like). Such questions might prompt a user to provide a textual answer (e.g., by inputting an answer in a text field), to select one of a plurality of answers (e.g., select a single correct answer from a plurality of candidate answers), or the like.

In some instances, these authentication questions might be based on false information. For example, a user might be asked if they conducted a transaction at a nonexistent merchant, might be asked when they conducted a purchase they never conducted, or the like. For example, as part of authenticating a user trying to access a credit card website, a random store that the user never conducted a transaction at might be selected, and a user might be asked to confirm whether or not they used a credit card to purchase items at the particular store. As another example, a user might be provided a list of four merchants, including only one where the user has in fact conducted a transaction, and the user might be asked to select, from the merchants, the merchant where they have recently conducted a transaction. In this manner, the question might cause a user to confirm whether or not they conducted a transaction at a nonexistent merchant, might be asked to select a single valid answer among a collection of valid and invalid answers, or the like. Such questions might be referred to as "false authentication questions" or "false questions," and might be used to ensure that nefarious actors cannot glean personally identifying information about a user through authentication questions. After all, if every question presented to the user is generated based on legitimate information about a user, nefarious actors might be able to brute-force or otherwise be able to guess their way into learning personal information about a user. As such, the process of using false authentication questions can significantly improve the accuracy and security of the authentication process, particularly since it avoids a circumstance where all questions are based on genuine account information. To generate these false authentication questions, a computing device might be configured to generate the questions using random or otherwise simulated data. For example, a computing device might generate a fake transaction (e.g., a transaction for coffee at a nonexistent coffee shop called Tim's Coffee) and, based on that fake transaction, generate a false authentication question (e.g., "When did you last purchase coffee at Tim's Coffee?").

The use of false, simulated, and/or otherwise fake data to formulate false authentication questions may be undesirably confusing for a user. For example, a computing device might determine, based on a transaction history indicating that a user never conducted a transaction at a particular store (e.g., "Joe's Coffee"), to ask a user to confirm whether or not they conducted a transaction at a particular store. In such an example, the user might be expected to respond in the negative. That said, the user may have in fact conducted a transaction Joe's Coffee, albeit with a different financial account or with cash. As such, while the user might correctly respond in the affirmative (e.g., "I did shop at Joe's Coffee"), the user might nonetheless be blocked from accessing their financial account because the computing device might incorrectly assume, based on the transaction history, that the user never conducted a transaction at Joe's Coffee.

Aspects described herein may address these and other problems, and generally improve the quality, efficiency, and speed of computer authentication systems by offering improved selection and generation of authentication questions based on transaction histories.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may allow for improved generation of authentication questions by using e-mail processing to avoid generating questions about false merchants that might be inadvertently confusing or inaccurate. This may have the effect of avoiding confusion and false rejections during an authentication process, improving the process of authentication overall. According to some aspects, these and other benefits may be achieved by identifying merchants where a user has conducted a transaction and removing those merchants from a plurality of false merchants that is used to generate an authentication question. In implementation, this may be implemented by processing one or more e-mails associated with a user to determine one or more merchants where a user is likely to have conducted a transaction.

More particularly, some aspects described herein may provide a computer-implemented method for intelligently generating false authentication questions by removing, from a set of organizations used to generate the false authentication questions, organizations detected in an e-mail account of the user. The method may comprise receiving, from a user device, a request for access to an account associated with a user; identifying a plurality of organizations by querying an organizations database; receiving, from an e-mail server, one or more e-mails associated with the account; processing the one or more e-mails to identify one or more organizations, wherein the one or more organizations correspond to one or more transactions conducted by the user; generating a modified plurality of organizations by removing, from the plurality of organizations, the one or more organizations; generating an authentication question related to at least one of the modified plurality of organizations; providing the authentication question to the user device; receiving, from the user device, a response to the authentication question; and providing, based on the response to the authentication question, the user device access to the account.

According to some embodiments, processing the one or more e-mails to identify the one or more organizations may comprise determining an e-mail template corresponding to a first organization and identifying, based on comparing the e-mail template to at least one of the one or more e-mails, a second organization. Processing the one or more e-mails to identify the one or more organizations may additionally and/or alternatively comprise training, using input data comprising a plurality of e-mails with tagged organizations, a machine learning model to identify indicators of organizations in e-mail data; providing, as input to the machine learning model, the one or more e-mails; and receiving, as output from the machine learning model, an indication of the one or more organizations. The method may further comprise identifying, based on the one or more e-mails, a good or service, wherein generating the authentication question is based on the good or service. The method may further comprise identifying, based on the one or more e-mails, an average expenditure associated with the user, wherein generating the authentication question is based on the average expenditure. Identifying the plurality of organizations may comprise randomly selecting, from the organizations database, a predetermined quantity of organizations. The method may further comprise identifying one or more aliases associated with the one or more organizations, wherein generating the modified plurality of organizations comprises removing, from the plurality of organizations and based on the one or more aliases, at least one of the plurality of organizations. Receiving the one or more e-mails associated with the account may comprise querying the e-mail server for e-mails associated with a time period. Removing the one or more organizations may comprise determining that a quantity of the modified plurality of organizations satisfies a threshold; and adding, to the modified plurality of organizations, indicators of additional organizations Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 6A depicts how an organizations database, a transactions database, and an e-mail database may store indications of different organizations;

FIG. 6B depicts correct and incorrect options for an authentication question based on the data stored by the organizations database, transactions database, and e-mail database in FIG. 6A; and FIG. 6C depicts a user interface comprising an authentication question generated based on the correct and incorrect options in FIG. 6B.

DETAILED DESCRIPTION

Figure 1:
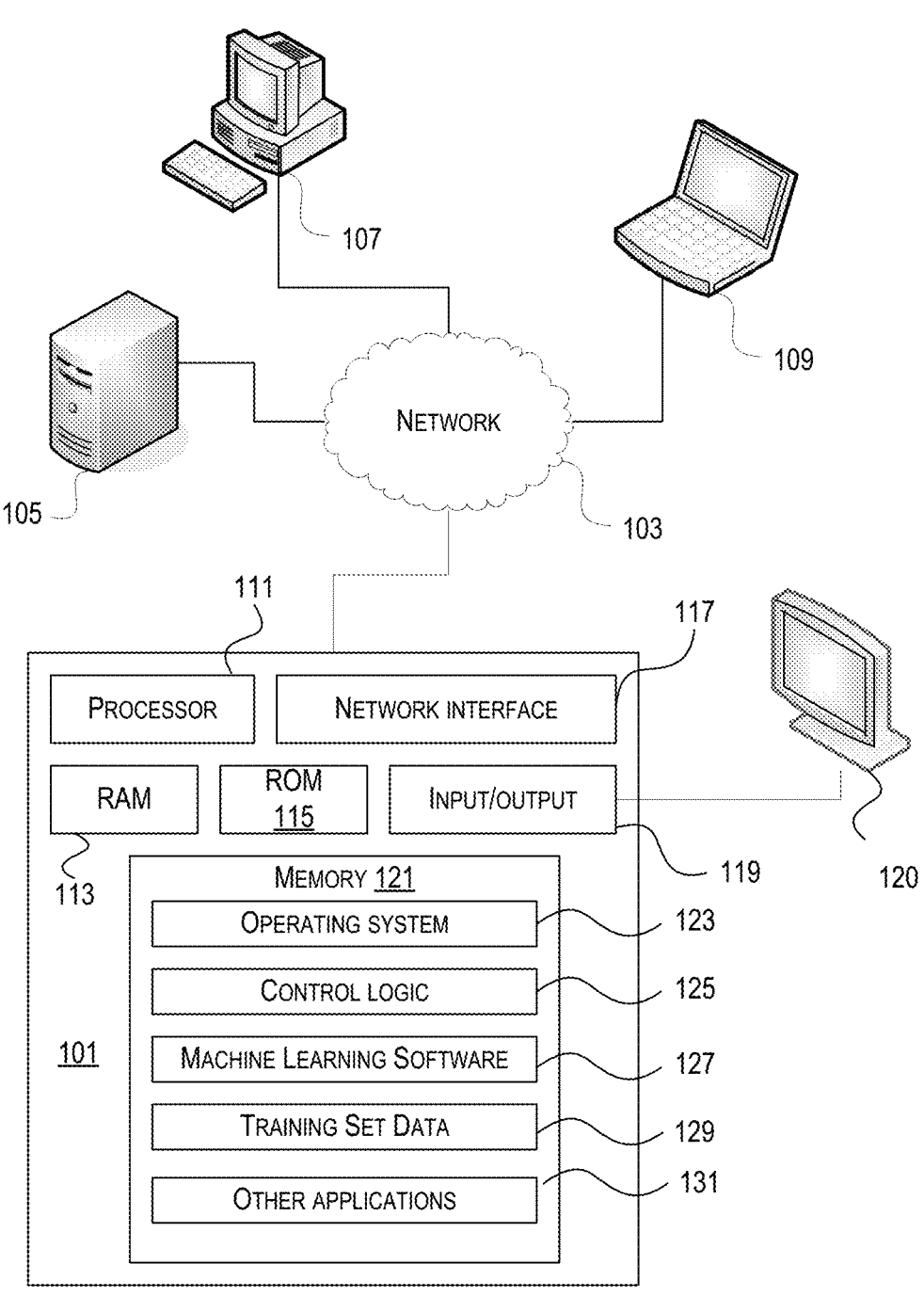
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for improving the accuracy and fidelity of authentication questions that are generated using, in whole or in part, falsified or simulated merchant information. As discussed further herein, this combination of features may allow for such questions to avoid confusing users, particularly where those users might conduct transactions using a variety of payment methods.

As an example of the sort of confusion avoided by the method and system described herein, a computing device might generate an authentication question to authenticate a user. As part of generating that authentication question, the computing device might query a transactions database to determine one or more transactions conducted by the user over a period of time. The generated authentication question might prompt a user to select, from a list of four merchants, a merchant where the user has, according to the transactions database, conducted a transaction. For instance, the authentication question might comprise three incorrect answers (e.g., "Joe's Coffee," "Tim's Coffee," "Bob's Coffee") and a single correct answer ("Ron's Coffee"). That said, the user might have in fact shopped at Joe's Coffee, but might have done so in cash, or using a transaction method not monitored by the aforementioned transactions database. As such, while the computing device might assume the correct answer to the authentication question is "Ron's Coffee," the correct answer might in fact be either "Joe's Coffee" or "Ron's Coffee." This can introduce undesirable confusion in the authentication process: after all, if the user selects "Joe's Coffee," even though that answer is correct, authentication might be rejected.

Aspects described herein improve the functioning of computers by improving the accuracy and security of computer-implemented authentication processes. The steps described herein relate to the authentication of users of computing devices, and in particular improving the manner in which computing devices generate and present authentication questions. By improving the fidelity and security of such authentication processes, users might be more readily provided legitimate access to computing resources, while unauthorized actors might be better prevented from gaining access to those same computing resources. Such processes could not be performed by a human being alone, as they focus on computer-implemented authentication and using multiple sources of digital data (e.g., e-mail data, transaction data) to lower the possibility of user confusion. This can, in many ways, save computing resources: for instance, by improving the accuracy and clarify of authentication processes, computing devices might be less likely to inadvertently block legitimate attempts to access computing resources.

Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, training set data 129, and other applications 129. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125 and/or software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Figure 2:
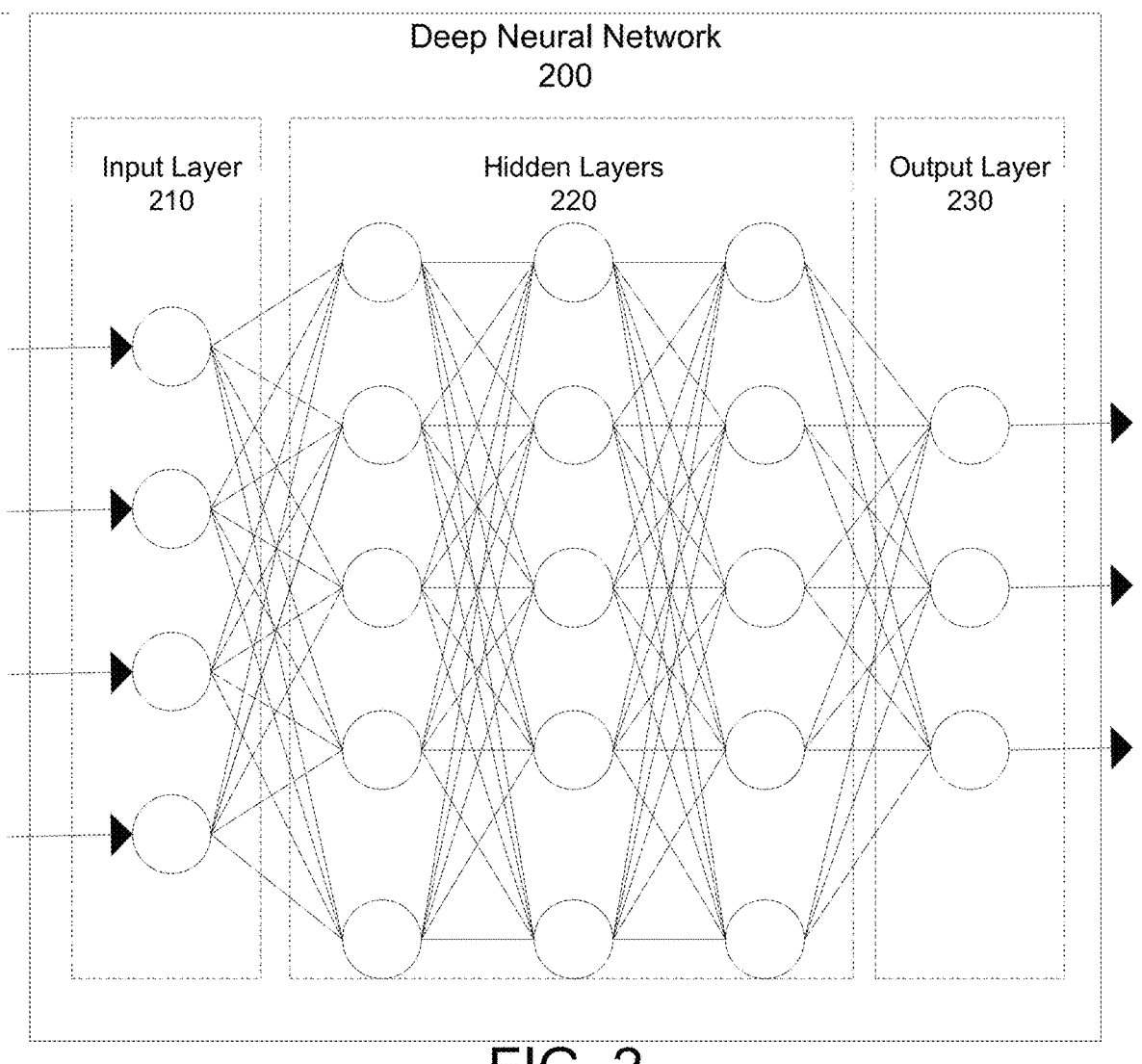
FIG. 2 depicts an example deep neural network architecture for a model according to one or more aspects of the disclosure.

FIG. 2 illustrates an example deep neural network architecture 200. Such a deep neural network architecture might be all or portions of the machine learning software 127 shown in FIG. 1. That said, the architecture depicted in FIG. 2 need not be performed on a single computing device, and might be performed by, e.g., a plurality of computers (e.g., one or more of the devices 101, 105, 107, 109). An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

An artificial neural network may have an input layer 210, one or more hidden layers 220, and an output layer 230. A deep neural network, as used herein, may be an artificial network that has more than one hidden layer. Illustrated network architecture 200 is depicted with three hidden layers, and thus may be considered a deep neural network. The number of hidden layers employed in deep neural network 200 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model.

Figure 3:
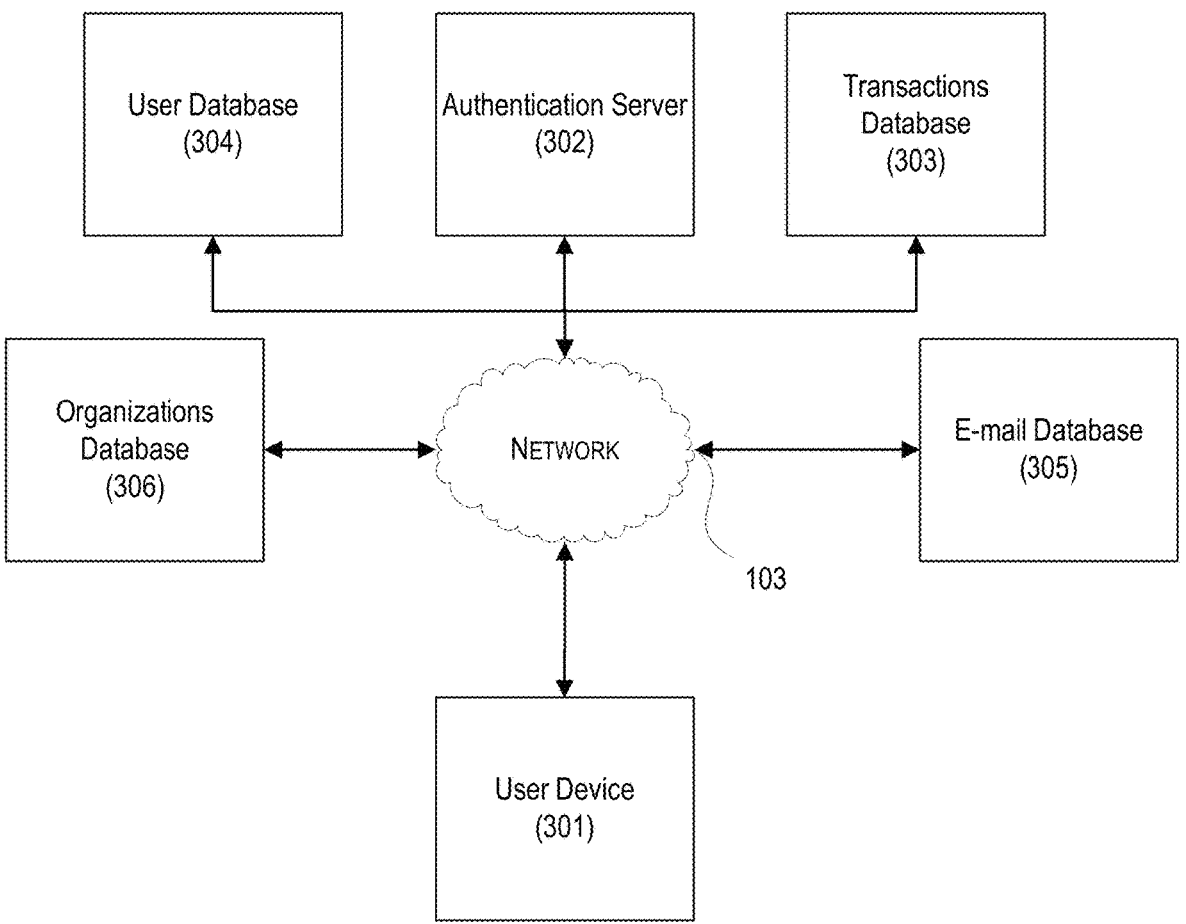
FIG. 3 depicts a system comprising different computing devices that may be used in implementing one or more aspects of the disclosure in accordance with one or more illustrative aspects discussed herein.

FIG. 3 depicts a system for authenticating a user device 301. The user device 301 is shown as connected, via the network 103, to an authentication server 302, a transactions database 303, a user database 304, an e-mail database 305, and an organizations database 306. The network 103 may be the same or similar as the network 103 of FIG. 1. Each of the user device 301, the authentication server 302, the transactions database 303, the user database 304, the e-mail database 305, and/or the organizations database 306 may be one or more computing devices, such as a computing device comprising one or more processors and memory storing instructions that, when executed by the one or more processors, perform one or more steps as described further herein. For example, any of those devices might be the same or similar as the computing devices 101, 105, 107, and 109 of FIG. 1.

As part of an authentication process, the user device 301 might communicate, via the network 103, to access the authentication server 302 to request access (e.g., to a user account). For example, the user device 301 might access a website or user interface associated with the authentication server 302. The authentication server 302 may then prompt (e.g., via a user interface) the user device 301 to answer one or more authentication questions. These questions might relate to a username, a password, a user PIN, or the like. In the case of questions relating to a username, a password, or the like, the questions might be generated based on data stored by the user database 304. Such authentication questions might additionally and/or alternatively relate to one or more transactions conducted by a user. Such questions (e.g., those relating to one or more transactions conducted by a user) might be generated based on data stored by the transactions database 303. Such questions might comprise one or more false answers, which might be based on one or more organizations indicated in the data of the organizations database 306. For example, the organizations database 306 might store a long list of random merchants, and the false answers might comprise indications of one or more of those random merchants. Based on the answers provided by a user of the user device 301, the user might be provided access (to, e.g., a user account).

The user database 304 might store information about one or more user accounts, such as a username, password, or the like. For example, as part of creating an account, a user might provide a username, a password, and/or one or more answers to predetermined authentication questions (e.g., "What is the name of your childhood dog?"), and this information might be stored by the user database 304. The authentication server 302 might use this data to generate authentication questions. The user database 304 might additionally and/or alternatively store preferences for one or more user accounts relating to authentication. For example, the user database 304 might store, for a particular user account, an e-mail for a user, such as an e-mail account managed by the e-mail database 305. As another example, the user database 304 might store preferences indicating that certain users are required to use two-factor authentication as part of authentication.

The transactions database 303 might comprise data relating to one or more transactions conducted by one or more financial accounts. For example, the transactions database 303 might maintain all or portions of a general ledger for various financial accounts associated with one or more users. The data stored by the transactions database 303 may indicate one or more merchants (e.g., where funds were spent), an amount spent (e.g., in one or more currencies), a date and/or time (e.g., when funds were spent), or the like. The data stored by the transactions database 303 might be generated based on one or more transactions conducted by one or more users. For example, a new transaction entry might be stored in the transactions database 303 based on a user purchasing an item at a store online and/or in a physical store. As another example, a new transaction entry might be stored in the transactions database 303 based on a recurring charge (e.g., a subscription fee) being charged to a financial account.

The account data stored by the user database 304 and the transactions database 303 may, but need not be related. For example, the account data stored by the user database 304 might correspond to a user account for a bank website, whereas the financial account data stored by the transactions database 303 might be for a variety of financial accounts (e.g., credit cards, checking accounts, savings accounts)

managed by the bank. As such, a single user account might provide access to one or more different financial accounts, and the accounts need not be the same. For example, a user account might be identified by a username and/or password combination, whereas a financial account might be identified using a unique number or series of characters.

The e-mail database 305 might comprise data associated with one or more e-mails corresponding to one or more e-mail accounts. For example, the e-mail database 305 might store data associated with one or more e-mails associated with a user's e-mail account. These e-mails may comprise information such as a sender, a recipient, a subject line, body text, one or more attachments, or the like. The user database 304 might indicate one or more e-mail accounts associated with a particular user. For example, the user database 304 might store information indicating, for a particular user, one or more corresponding e-mail accounts managed by the e-mail database 305. Thus, for example, the same user might have two e-mail accounts (with corresponding data stored in the e-mail database 305), a single user account (with corresponding data stored in the user database 305), and the single user account might provide the user online access to three financial accounts (with corresponding data stored in the transactions database 303).

The organizations database 306 might store data relating to one or more organizations, including indications (e.g., names) of organizations, aliases of the organizations, and the like. That data might be used to generate authentication questions that comprise both correct answers (e.g., based on data from the transactions database 303 indicating one or more organizations where a user has conducted a transaction) and real-looking but false answers (e.g., based on data from the organizations database 306, which might be randomly-selected organizations where a user has not conducted a transaction). For example, a computing device might generate an authentication question comprising both correct and correct options by querying the organizations database 306 for a list of organizations (e.g., popular organizations where average customers in a particular area commonly shop). The computing device might then generate a question comprising one correct option (e.g., an organization indicated by the transactions database 303; that is, where a user has in fact shopped) and three incorrect options (e.g., three organizations from the organizations database 306; that is, where a user might appear to have shopped but did not in fact shop).

Figure 4A:
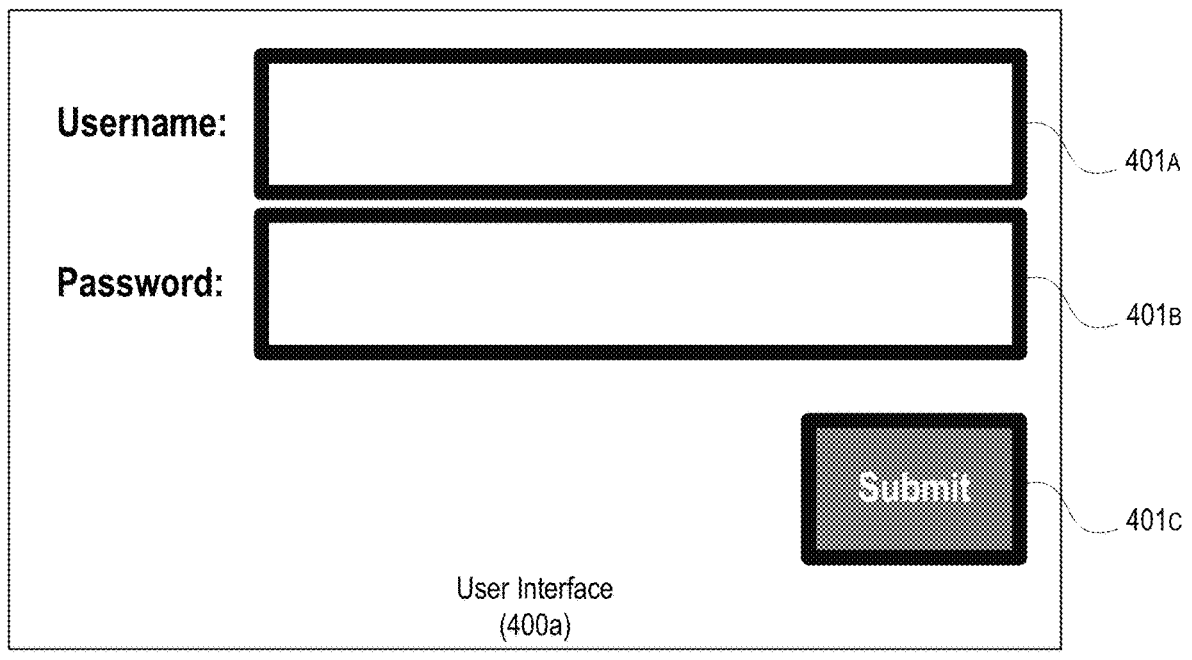
FIG. 4A depicts a user interface for authenticating access, by a user, to a financial account using a username and password.

FIG. 4A depicts an illustrative user interface 400a comprising a username field 401a, a password field 401b, and a submit button 401c. The user interface 400a might be provided by, e.g., the authentication server 302 as part of determining, using data stored by the user database 304, whether to provide the user device 301 access to an account. For example, a user might be prompted to type in a candidate username into the username field 401a and a candidate password into the password field 401b, and the user might be provided access to an account based on whether the candidate username and the candidate password match data stored by the user database 304. As such, the user interface 400a depicts a circumstance where a user is provided two different authentication questions: specifically, as shown in FIG. 4A, they are prompted to provide both a valid username and a valid password.

Figure 4B:
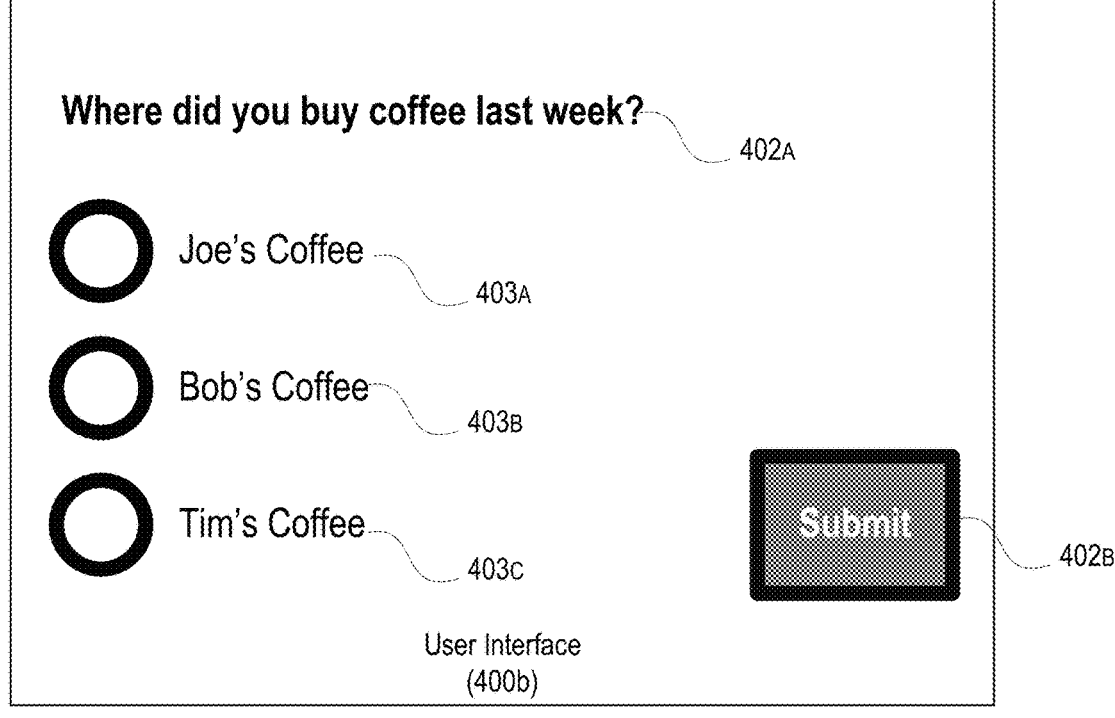
FIG. 4B depicts a user interface for authenticating access, by a user, to a financial account using a question relating to where a user purchased an item.

FIG. 4B depicts a user interface 400b comprising an authentication question 402a which allows a user to select one of a plurality of options 403a-403c and submit the selection using a submit button 402b. As previously discussed, an authentication question, such as the authentication question 402a, might relate to a past transaction of a user, such as (as shown in FIG. 4B) a question relating to where a user purchased an item (coffee) at a particular time (last week). The plurality of options 403a-403c might comprise one or more correct answers and one or more incorrect answers. For example, in the example provided in FIG. 4B, the user might have in fact purchased coffee at Bob's Coffee (option 403b) and not Joe's Coffee (option 403a) and/or Tim's Coffee (option 403c).

FIG. 4B illustrates that authentication questions, such as the authentication question 402a, might be generated, in whole or in part, based on false information. For example, while Joe's Coffee (option 403a) and/or Tim's Coffee (option 403c) might be real merchants and real coffee shops, they might have been selected based on determining that, according to data stored by the transactions database 303, a user has not shopped at these locations. That said, Joe's Coffee (option 403a) and/or Tim's Coffee (option 403c) need not be real coffee shops at all: the names might have been randomly generated (e.g., by a machine learning algorithm trained using input comprising a variety of legitimate store names) to appear genuine.

FIG. 4B also illustrates a potential source of confusion for authentication questions such as the authentication question 402a. In the circumstance depicted in FIG. 4B, the computing device may assume that only option 403b is correct. That said, the user might have actually conducted a transaction at a "Tim's Coffee" in the last week, albeit paying in cash or using a credit card not tracked by the transactions database 303, such that data about that transaction might not be stored by the transactions database 303. Additionally and/or alternatively, the user might have in fact actually conducted a transaction at a "Timothy's Coffee" in the last week, such that they might be confused as to whether "Tim's Coffee" and "Timothy's Coffee" are the same.

Having discussed several examples of computing devices which may be used to implement some aspects as discussed further below, discussion will now turn to a method for generating authentication questions in a manner that avoids confusion regarding organizations where a user may have conducted a transaction.

Figure 5:
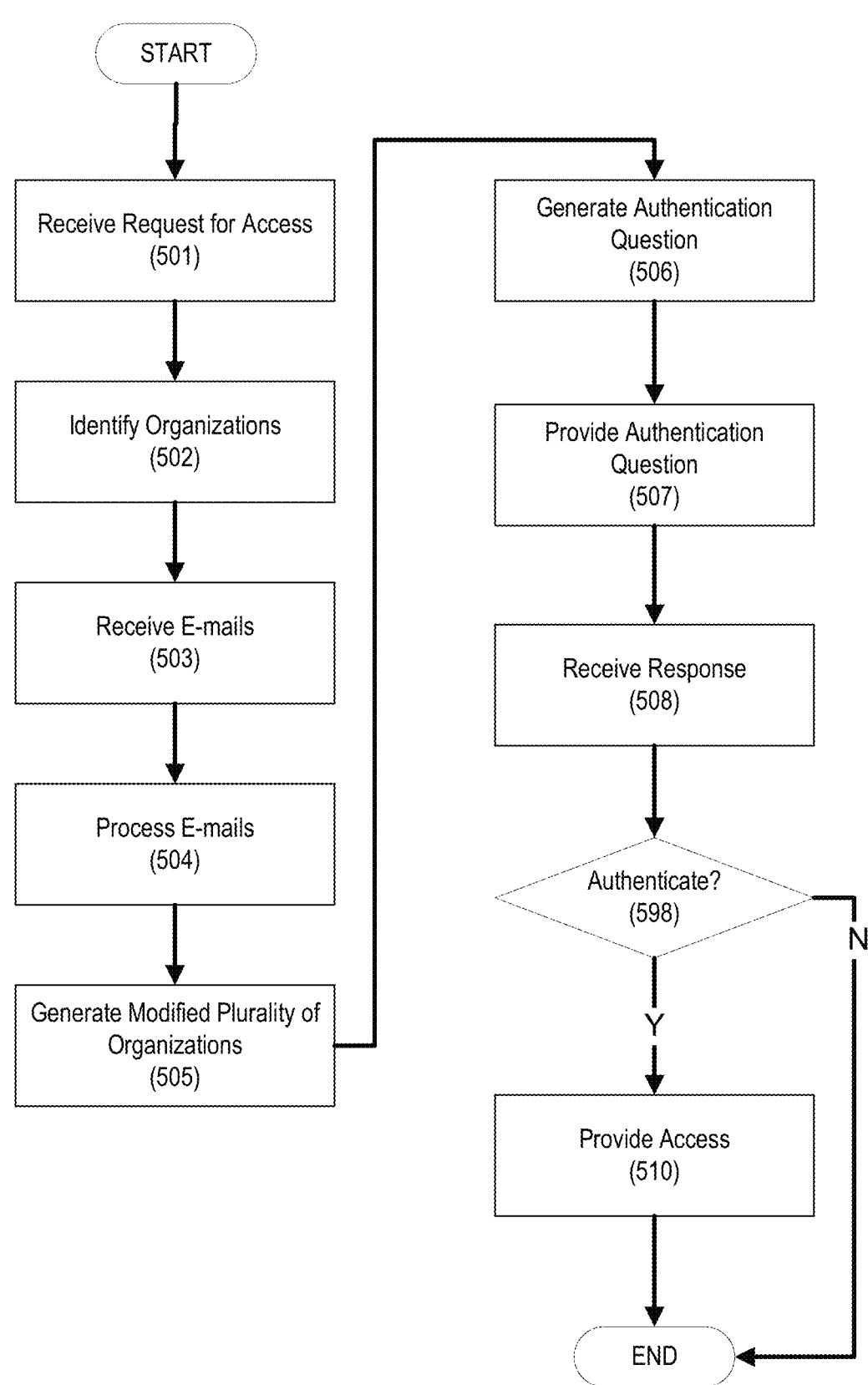
FIG. 5 depicts a flow chart for a method of generating authentication questions.

FIG. 5 illustrates an example method 500 for generating authentication questions in accordance with one or more aspects described herein. The method 500 may be implemented by a suitable computing system, as described further herein. For example, the method 500 may be implemented by any suitable computing environment by a computing device and/or combination of computing devices, such as one or more of the computing devices 101, 105, 107, and 109 of FIG. 1, and/or any computing device comprising one or more processors and memory storing instructions that, when executed by the one or more processors, cause the performance of one or more of the steps of FIG. 5. The method 500 may be implemented in suitable program instructions, such as in machine learning software 127, and may operate on a suitable training set, such as training set data 129. The steps shown in the method 500 are illustrative, and may be re-arranged or otherwise modified as desired.

In step 501, a computing device might receive a request for access. The request for access might be for an account associated with a user. The request for access might be associated with a user accessing, via a user device, a website, a log-in screen, or the like. The request or access might comprise a request for access to an account, such as a financial services account, a banking account, or the like. The request for access might comprise, for instance, a user clicking a "Log In" button on a website. With that said, the request for access need not originate in any particular format or manner.

In step 502, the computing device may identify a plurality of organizations by querying an organizations database, such as the organizations database 306. The organizations in this list might comprise one or more merchants where any customer (not necessarily just the user associated with the request for access in step 501) might have conducted a transaction. For instance, the plurality of organizations may comprise one or more stores, restaurants, and vendors where a customer might spend money. In some instances, the organizations database might store a list of the most popular merchants in the United States, among customers of a particular bank, or the like. In this manner, the plurality of organizations might be identified for use in later generating an authentication question. This plurality of organizations need not comprise organizations where a user (e.g., the user associated with the request for access in step 501) has conducted a transaction: in fact, as will be discussed below, this plurality will be processed to remove organizations where the user is known to have conducted transactions, such that a plurality of organizations where a user has not conducted a transaction may be determined.

Querying the organizations database might comprise querying the organizations database based on information about the user associated with the request for access received in step 501. For instance, because organizations where a user might conduct a transaction might vary based on user demographics (e.g., the age of the user, where the user is located), the organizations database might be queried based on demographics of the user associated with the request for access received in step 501. For example, geographically-identifying information for a user (e.g., their ZIP code) might be identified, and the organizations database might be queried using the geographically-identifying data associated with the user to retrieve, from the organizations database, a plurality of organizations associated with a particular region associated with the user. As another example, the organizations database might be queried using an age of the user to retrieve, from the organizations database, a plurality of organizations where customers around that age customarily shop.

In step 503, the computing device may receive e-mails associated with the account. The e-mails may be received from an e-mail server, such as the e-mail database 305. The e-mails may be received by determining one or more e-mail accounts corresponding to the user associated with the request for access in step 501 and querying, based on the one or more e-mail accounts, the e-mail server. For example, the computing device might use the user database 304 to determine one or more e-mail accounts corresponding to the user associated with the request for access in step 501 and then, using an identifier of those e-mail accounts (e.g., an e-mail address), query the e-mail database 305.

The computing device might require permission, by a user, to receive the e-mails in the e-mail database 305. For example, the e-mail database 305 might store personal e-mail data for a user, such that the user might have to provide the computing device permission to access the e-mails. As such, step 503 might comprise requesting and receiving permission to analyze the e-mails of the user. Such permission might additionally and/or alternatively be received well in advance of the authentication process. For example, as part of registering for an account with a banking website, a user might provide the banking website access to their e-mail account.

The e-mail database 305 might be configured to periodically receive and store e-mails from external e-mail accounts. For example, the e-mail database might be an e-mail server managed by a financial institution that periodically retrieves e-mail data from a plurality of different external e-mail accounts via different e-mail servers. In this manner, the e-mail database 305 might be a cache e-mails from one or more e-mail accounts of a user. This might be advantageous because the cache could be managed to protect user security: for example, the cache may be periodically cleared and/or pruned to remove e-mails that do not relate to transactions.

Receiving the one or more e-mails associated with the account may comprise querying an e-mail server (e.g., the e-mail database 305) for e-mails associated with a time period. Retrieving excessively old e-mails might be undesirable because the transactions indicated by those e-mails might be rather old. For example, a user might not remember whether they shopped at a particular grocery store three years ago. As such, the query might be limited to a particular period of time, such as within the last year, within the last month, or the like. That said, certain transactions (e.g., for very significant purchases, such as for a car or a very expensive item), though old, might be nonetheless memorable to a user. As such, the e-mail server might be queried for all e-mails for a particular period (e.g., the last month), but might additionally and/or alternatively be queried for only particular e-mails (e.g., those containing dollar amounts over ten thousand dollars) for a broader period (e.g., the last year).

In step 504, the computing device may process the received e-mails. Processing the e-mails may comprise identifying one or more organizations in the received e-mails. The one or more organizations identified during processing may correspond to one or more transactions conducted by the user. Advantageously, such e-mails might be for transactions where the user used cash and/or another financial account to pay, such that the e-mails might more fully represent spending of the user as compared to the data in the transactions database 303. As such, the processing in step 504 might comprise using a computing device to analyze all or portions of e-mails to identify one or more organizations where a user has conducted a transaction, whether or not that transaction is reflected in the data stored by the transactions database 303. As will also be detailed further below, such processing might be performed using a natural language processing algorithm, a trained machine learning model, or the like.

Processing the e-mails might comprise use of a machine learning model, such as might be implemented using the deep neural network 200. A computing device may train, using input data comprising a plurality of e-mails with tagged organizations, a machine learning model to identify indicators of organizations in e-mail data. For example, the input data might comprise large quantities of different e-mails, with various aspects of those e-mails (e.g., organizations, goods/services involved in a transaction, dollar amounts) tagged. This input data might train the machine learning model to identify, e.g., an organization in an e-mail. Then, the computing device may provide, as input to the machine learning model, the one or more e-mails received in step 503. The computing device may receive, as output from the machine learning model, an indication of one or more organizations. In this manner, the machine learning model may learn to tag organizations in e-mails.

Processing the e-mails may entail use of e-mail templates. For example, a particular organization might use a certain format of e-mail (e.g., a certain layout that uses certain stylesheets, a certain sender e-mail address, a certain subject line format, etc.) to confirm a purchase made by a user. Such templates might be determined by analyzing one or more previous e-mails by an organization. Using these templates, e-mails having that format might be identified and associated with the organization. In this manner, even though such purchase confirmation e-mails might vary (e.g., in terms of the number/nature of goods/services purchased), the e-mails might nonetheless be more readily identified as originating from an organization. In this way, an e-mail template corresponding to a first organization might be determined and, based on comparing the e-mail template to at least one of the one or more e-mails, an organization might be identified.

The e-mails processed need not always be received directly from an organization, but might instead be received by another organization. For example, an e-mail from a first organization (e.g., a payment processing organization, such as PayPal Holdings, Inc. of San Jose, California) might correspond to a transaction conducted at another organization (e.g., an online store, and/or a physical store that uses a payment processing network associated with the first organization). In such a circumstance, processing the e-mails may entail use of an e-mail template for a first organization to identify a second organization. For example, using an e-mail template associated with PayPal (a first organization), an e-mail might be processed to identify an online store where the user recently shopped (a second organization). As another example, using an e-mail template associated with an insurance company (a first organization), an e-mail from that insurance company might be processed to determine where a customer might have recently purchased a vehicle (e.g., a specific dealership indicated in the insurance policy). Accordingly, templates might be determined not only for merchants themselves, but also other organizations through which e-mails reflecting purchasing activity might be received.

Processing the e-mails might comprise identifying a good or service. As will be described further below, an authentication question might relate not only to whether a user conducted a transaction at a particular organization, but also what goods/services were purchased by the user, how much the user paid, and the like. As such, part of processing the e-mails might comprise identifying those goods/services, including the name of the goods and/or services, the cost of the goods and/or services, and the like. Identifying the goods/services might comprise use of a variety of different processes and algorithms, such as a machine learning model (as discussed above), a natural language processing algorithm, or the like.

Processing the e-mails might comprise identifying, based on the e-mails, an average expenditure associated with a user. An average expenditure associated with a user might be based on one or more e-mails indicating past transactions conducted by the user. Moreover, the average expenditure might correspond to different categories of goods and/or services. For example, a user might customarily spend around ten dollars at coffee shops and around forty dollars at restaurants. As will be detailed below, this information might be used to generate more accurate (and less easily guessed) authentication questions. After all, if an authentication question asks whether a user recently spent a thousand dollars at a particular coffee shop, the fact that the answer to that question is negative might be easily guessed. Instead, based on the average expenditure determined for coffee shops, it might be instead preferable to ask whether a user recently spent ten dollars at a particular coffee shop, as that question might not be as easily guessed by a nefarious party.

Processing the e-mails may comprise use of fuzzy, imprecise, and/or otherwise over-inclusive algorithms. For example, the e-mails might be processed using a fuzzy matching algorithm. As will be discussed later with respect to step 505, the one or more organizations identified in step 504 might be removed from the plurality of organizations identified in step 502. Over-inclusiveness in the organizations identified in step 504 is not undesirable, as doing so might help further reduce the possibility that a potentially confusing authentication question is generated.

In step 505, the computing device may generate a modified plurality of organizations by removing, from the plurality of organizations identified in step 502, the one or more organizations identified in step 504. Additionally and/or alternatively, generating the modified plurality of organizations may comprise removing, from the plurality of organizations identified in step 502, one or more organizations indicated in data stored by the transactions database 303. In this manner, organizations where a user has likely conducted a transaction may be removed from the plurality of organizations determined via the organizations database 306. In this manner, the plurality of organizations might better comprise one or more organizations where the user is unlikely to have conducted a transaction. As such, this plurality of organizations is less likely to cause confusion when used to generate incorrect answers for an authentication question.

Removing the one or more organizations identified in step 504 from the plurality of organizations identified in step 502 may comprise determining that a quantity of the modified plurality of organizations satisfies a threshold (e.g., that the quantity is less than a minimum number of organizations) and adding, to the modified plurality of organizations, indicators of additional organizations. It may be desirable for the modified plurality of organizations to comprise a threshold number of organizations. For example, if an authentication question will be generated to have four possible options (e.g., one correct option and three incorrect options), then the modified plurality of organizations should comprise at least three organizations. As such, if the modified plurality of organizations is less than three organizations, then the computing device may add, to the modified plurality of organizations, additional organizations. Adding additional organizations to the modified plurality of organizations might comprise retrieving additional organizations from the organizations database 306.

Generating the modified plurality of organizations may comprise removing, from the plurality of organizations, one or more aliases for an organization. An organization might be associated with a plurality of aliases, such as alternative names for the organization, slang terms for the organization, or the like. For example, a coffee shop might be referred to as all three of "Tim's Coffee," "Timothy's Coffee," and/or "Tim's." Accordingly, to remove an organization from the plurality of organizations (and thereby generate the modified plurality of organizations), all aliases for a particular organization should be removed. To determine one or more aliases for an organization, a database (e.g., the organizations database 306) might be queried.

In step 506, the computing device may generate an authentication question. The authentication question may relate to at least one of the modified plurality of organizations. The authentication question might be based on data from the transactions database 303. In this manner, the authentication question might ask a user to identify a merchant where they conducted a transaction (e.g., as indicated by data stored in the transactions database 303) among options comprising other merchants where they did not conduct a transaction (e.g., one or more merchants of the modified plurality of merchants). As such, generating the authentication question may comprise generating a textual question (e.g., "Where did you shop for a pastry and coffee last week?"), one or more correct answers (e.g., "Bob's Coffee") based on data stored in the transactions database 303, and one or more incorrect answers (e.g., "Joe's Coffee," "Tim's Coffee," "Rob's Coffee") based on the modified plurality of organizations.

Generating the authentication question may be based on a good or service identified in the e-mails processed in step 504. As indicated above, the e-mails of an e-mail server (e.g., the e-mail database 305) might be processed to identify one or more goods and/or services involved in a transaction, including a name of the goods and/or services, a cost of the goods and/or services, or the like. Such information might be used to formulate questions relating to the goods and/or services. For example, certain authentication questions (e.g., "Did you buy coffee last week?") might be avoided if an e-mail indicates that a user might have recently purchased coffee.

Generating the authentication question may be based on an average expenditure associated with a user. As indicated above, the e-mails of an e-mail server (e.g., the e-mail database 305) might be processed to identify an average expenditure of a user. Such an average expenditure might be based on an organization in question, a category of merchant, or the like. For example, a user might customarily spend around twenty dollars at lunch restaurants and fifty dollars at movie theaters. The authentication question might use this information to more realistically depict fake information. For example, if the authentication question is "Where did you recently spend one hundred dollars?," it might be undesirable for one option to be a lunch restaurant, as such an option would be unrealistic (and would thereby make the authentication question more easily guessed by an unauthorized party).

In step 507, the computing device may provide the authentication question to, e.g., a user device. Providing the authentication question may comprise causing display of the authentication question in a user interface, such as on a website.

In step 508, the computing device may receive a response to the authentication question. The response to the authentication question may be received from a user device. The answer might be a selection of a radio option, a written response in a text box, or the like. The response need not be in any particular format.

In step 509, the computing device may determine, based on the response received in step 508, whether to authenticate the request for access. Determining whether to authenticate the request for access might be based on whether the user correctly answered the question generated in step 506. If the computing device decides to authenticate the request, the method 500 proceeds to step 510. Otherwise, the method 500 ends.

In step 510, based on determining to authenticate the request for access in step 508, access to an account may be provided. Providing access to the account might comprise providing a user (via, e.g., their user device) access to a protected part of a website, to encrypted data, or the like.

FIG. 6A illustrates organizational data that might be stored by the organizations database 306, the transactions database 303, and the e-mail database 305. The organizations database 306 may store a list of a variety of popular organizations (Store A-F, as shown in FIG. 6A), such as stores that customers in a particular region frequent. The transactions database 303 indicates that a user has shopped at Store A and Store E. The e-mail database 305 shows that an e-mail account associated with the user has e-mails relating to transactions conducted at Store A, Store D, and Store F.

FIG. 6B illustrates both false options 601 and correct options 602 which might be used to generate an authentication question in step 506 of FIG. 5. Particularly, the false options 601 are a set of stores (Store B and Store C) in the organizations database 306 that are not in the transactions database 303 or the e-mail database 305. In other words, these organizations are locations where a user is likely to not have conducted a transaction. Note that the false options 601 also include an additional store (Store G). In this circumstance, Store G might have been added to ensure that there are at least three different options in the false options 601. The correct options 602 comprise stores where the user appears to have conducted a transaction based on the data stored by the transactions database 303 and the data stored by the e-mail database 305.

FIG. 6C illustrates an authentication question, in a user interface 603, that has been generated based on the false options 601 and the correct options 602 of FIG. 6B. The user interface 603 includes two false options from the false options 601 (specifically, Store C and Store G) and a single correct option (specifically, Store A).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   receiving, from an e-mail server, one or more e-mails associated with an account associated with a user;
   identifying one or more e-mail templates corresponding to a plurality of organizations indicated by an organizations database;
   processing, based on the one or more e-mail templates, the one or more e-mails to identify at least one e-mail associated with one or more organizations of the plurality of organizations;
   generating a modified plurality of organizations by removing, from the plurality of organizations, the one or more organizations;
   generating an authentication question related to at least one of the modified plurality of organizations; and
   providing, based on a response to the authentication question, a user device access to the account.

2. The method of claim 1, wherein processing the one or more e-mails to identify the one or more organizations comprises:
   identifying, based on comparing at least one of the one or more e-mail templates to at least one of the one or more e-mails, a second organization.

3. The method of claim 1, wherein processing the one or more e-mails to identify the one or more organizations comprises:
   training, using input data comprising a plurality of e-mails with tagged organizations, a machine learning model to identify indicators of organizations in e-mail data;

providing, as input to the machine learning model, the one or more e-mails; and receiving, as output from the machine learning model, an indication of the one or more organizations.

4. The method of claim 1, further comprising:

identifying, based on the one or more e-mails, a good or service, wherein generating the authentication question is based on the good or service.

5. The method of claim 1, further comprising:

identifying, based on the one or more e-mails, an average expenditure associated with the user, wherein generating the authentication question is based on the average expenditure.

6. The method of claim 1, wherein identifying the plurality of organizations comprises:

randomly selecting, from the organizations database, a predetermined quantity of organizations.

7. The method of claim 1, further comprising:

identifying one or more aliases associated with the one or more organizations, wherein generating the modified plurality of organizations comprises removing, from the plurality of organizations and based on the one or more aliases, at least one of the plurality of organizations.

8. The method of claim 1, wherein receiving the one or more e-mails associated with the account comprises:

querying the e-mail server for e-mails associated with a time period.

9. The method of claim 1, wherein removing the one or more organizations comprises:

determining that a quantity of the modified plurality of organizations satisfies a threshold; and adding, to the modified plurality of organizations, indicators of additional organizations.

10. A computing device comprising:

one or more processors; and memory storing instructions that, when executed by the one or more processors, cause the computing device to:

receive, from an e-mail server, one or more e-mails associated with an account associated with a user;

identify one or more e-mail templates corresponding to a plurality of organizations indicated by an organizations database;

process, based on the one or more e-mail templates, the one or more e-mails to identify at least one e-mail associated with one or more organizations of the plurality of organizations;

generate a modified plurality of organizations by removing, from the plurality of organizations, the one or more organizations;

generate an authentication question related to at least one of the modified plurality of organizations; and provide, based on a response to the authentication question, a user device access to the account.

11. The computing device of claim 10, wherein the instructions, when executed by the one or more processors, cause the computing device to process the one or more e-mails to identify the one or more organizations by causing the computing device to:

identify, based on comparing at least one of the one or more e-mail templates to at least one of the one or more e-mails, a second organization.

12. The computing device of claim 10, wherein the instructions, when executed by the one or more processors, cause the computing device to process the one or more e-mails to identify the one or more organizations by causing the computing device to:

train, using input data comprising a plurality of e-mails with tagged organizations, a machine learning model to identify indicators of organizations in e-mail data;

provide, as input to the machine learning model, the one or more e-mails; and receive, as output from the machine learning model, an indication of the one or more organizations.

13. The computing device of claim 10, wherein the instructions, when executed by the one or more processors, cause the computing device to:

identify, based on the one or more e-mails, a good or service, wherein the instructions, when executed by the one or more processors, cause the computing device to generate the authentication question based on the good or service.

14. The computing device of claim 10, wherein the instructions, when executed by the one or more processors, cause the computing device to:

identify, based on the one or more e-mails, an average expenditure associated with the user, wherein the instructions, when executed by the one or more processors, cause the computing device to generate the authentication question based on the average expenditure.

15. The computing device of claim 10, wherein the instructions, when executed by the one or more processors, cause the computing device to identify the plurality of organizations by causing the computing device to:

randomly select, from the organizations database, a predetermined quantity of organizations.

16. One or more non-transitory computer-readable media storing instructions that, when executed by one or more processors, cause a computing device to:

receive, from an e-mail server, one or more e-mails associated with an account associated with a user;

identify one or more e-mail templates corresponding to a plurality of organizations indicated by an organizations database;

process, based on the one or more e-mail templates, the one or more e-mails to identify at least one e-mail associated with one or more organizations of the plurality of organizations;

generate a modified plurality of organizations by removing, from the plurality of organizations, the one or more organizations;

generate an authentication question related to at least one of the modified plurality of organizations; and provide, based on a response to the authentication question, a user device access to the account.

17. The computer-readable media of claim 16, wherein the instructions, when executed by the one or more processors, cause the computing device to process the one or more e-mails to identify the one or more organizations by causing the computing device to:

identify, based on comparing at least one of the one or more e-mail templates to at least one of the one or more e-mails, a second organization.

18. The computer-readable media of claim 16, wherein the instructions, when executed by the one or more processors, cause the computing device to process the one or more e-mails to identify the one or more organizations by causing the computing device to:

train, using input data comprising a plurality of e-mails with tagged organizations, a machine learning model to identify indicators of organizations in e-mail data;

provide, as input to the machine learning model, the one or more e-mails; and receive, as output from the machine learning model, an indication of the one or more organizations.

19. The computer-readable media of claim 16, wherein the instructions, when executed by the one or more processors, cause the computing device to:

identify, based on the one or more e-mails, a good or service, wherein the instructions, when executed by the one or more processors, cause the computing device to generate the authentication question based on the good or service.

20. The computer-readable media of claim 16, wherein the instructions, when executed by the one or more processors, cause the computing device to:

identify, based on the one or more e-mails, an average expenditure associated with the user, wherein the instructions, when executed by the one or more processors, cause the computing device to generate the authentication question based on the average expenditure.

\* \* \* \* \*